US011755937B2

(12) United States Patent
Ghosh et al.

(10) Patent No.: US 11,755,937 B2
(45) Date of Patent: Sep. 12, 2023

(54) MULTI-SOURCE MODELING WITH LEGACY DATA

(71) Applicant: General Electric Company, Schenectady, NY (US)

(72) Inventors: Sayan Ghosh, Niskayuna, NY (US); Jesper Kristensen, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 575 days.

(21) Appl. No.: 16/549,338

(22) Filed: Aug. 23, 2019

(65) Prior Publication Data

US 2020/0065695 A1 Feb. 27, 2020

Related U.S. Application Data

(60) Provisional application No. 62/722,300, filed on Aug. 24, 2018.

(51) Int. Cl.

| | |
|---|---|
| ***G06N 7/00*** | (2023.01) |
| ***G06N 7/01*** | (2023.01) |
| ***G06F 30/20*** | (2020.01) |
| *G06F 111/10* | (2020.01) |

(52) U.S. Cl.

CPC ............... *G06N 7/01* (2023.01); *G06F 30/20* (2020.01); *G06F 2111/10* (2020.01)

(58) Field of Classification Search

CPC ...... G06N 7/005; G06F 30/20; G06F 2111/10

USPC ............................................................ 703/2

See application file for complete search history.

(56) References Cited

U.S. PATENT DOCUMENTS

| | | | | |
|---|---|---|---|---|
| 6,662,357 | B1 | 12/2003 | Bowman-Amuah et al. | |
| 6,904,408 | B1 | 6/2005 | McCarthy et al. | |
| 8,762,298 | B1 | 6/2014 | Ranjan et al. | |
| 8,849,622 | B2 | 9/2014 | Melkumyan et al. | |
| 9,978,002 | B2 | 5/2018 | Schneiderman | |
| 2016/0299255 | A1* | 10/2016 | Dail | G01W 1/10 |
| 2019/0065939 | A1 | 2/2019 | Bourgoin et al. | |
| 2019/0087741 | A1 | 3/2019 | Wu et al. | |

OTHER PUBLICATIONS

Warnling_2017 (The Sparse Data Problem Within Classification Algorithms, The Effects of Sparse Data on the Naïve Bayes Algorithm, Stockholm, 2017). (Year: 2017).*

(Continued)

*Primary Examiner* — Brian S Cook

(74) *Attorney, Agent, or Firm* — HANLEY, FLIGHT & ZIMMERMAN, LLC

(57) ABSTRACT

A method and system to receive a dataset for a new design; receive datasets for a plurality of different legacy systems; determine a legacy model for each of the plurality of different legacy systems based on the respective dataset for each of the plurality of different legacy systems and the dataset for the new design; calculate a model weight to associate with each of the determined legacy models; determine, based on a combination of the determined legacy models for the plurality of different legacy systems and the weight associated therewith, a multi-source model for new data for the new design; and save a record of the determined multi-source model.

20 Claims, 15 Drawing Sheets

(56) References Cited

OTHER PUBLICATIONS

Naeini_2017 (Binary Classifier Calibration Using an Ensemble of Piecewise Linear Regression Models, Spring-Verlag Nov. 17, 2017). (Year: 2017).*
Kennedy_2001 (Bayesian Calibration of Computer Models, J.R. Statist. Soc. B 92001) 63, Part 3, pp. 425-464) (Year: 2001).*
Monteith_2011 (Turning Bayesian Model Averaging Into Bayesian Model Combination, Proceedings of International Joint Conference on Neural Networks, San Jose, California, USA, Jul. 31-Aug. 5, 2011) (Year: 2011).*
Ghosh, Sayan et al., "Bayesian Multi-Source Modeling with Legacy Data", American Institute of Aeronautics and Astronautics, GE Global Research Centre, 1 Research Circle, USA, Jan. 7, 2018, DOI: 10.2514/6.2018-1663, (pp. 1-12, 12 total pages).

* cited by examiner

MULTI-SOURCE MODELING WITH LEGACY DATA

BACKGROUND

In some aspects, engineering systems are becoming more and more complex while requirements (e.g., performance, environmental, cost, etc.) are becoming more stringent. Such aspects may have a direct impact on the time and cost to design new systems. A typical industrial approach to manage the time and cost while also achieving the performance goal(s) is to develop a derivative design, rather than a completely new and unconventional system. A benefit of designing a derivative design is that the engineers might leverage their knowledge and experience of the existing infrastructure. However, even a new derivative design comes with new technology, parameter settings, and operational conditions that have not been tested in the legacy systems. Therefore, new experiments are required to understand and design the new derivative design.

However, due to the complexity and high experimental cost(s) associated with the new system, only sparse data are generally available for the new design. The sparse data alone may not be sufficient to build an accurate model of the new system. Accordingly, there exists a need to overcome this challenge and provide a method and system that uses a limited data set from a new design and leverage the data available from legacy systems to efficiently provide an improved predictive capability and better inform, in some aspects, a design and decision-making process.

DETAILED DESCRIPTION

Figure 1A:
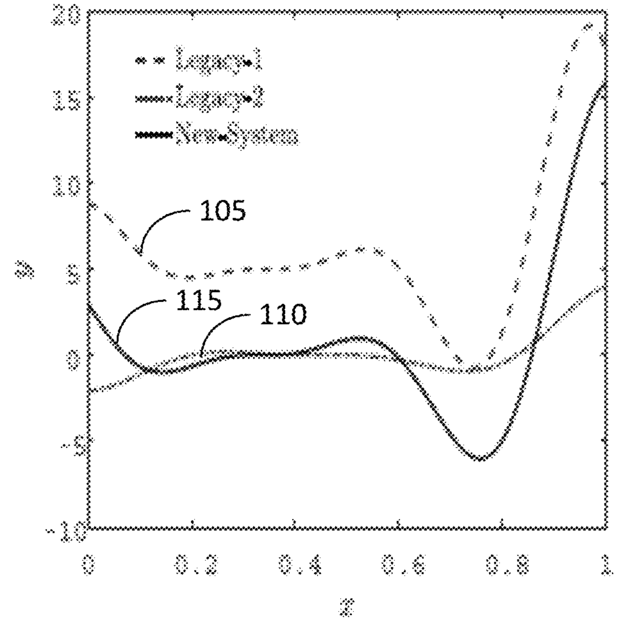
FIGS. 1A and 1B are illustrative of Bayesian model averaging applied to legacy data.

In some aspects, one approach for handling multiple sources of data is known as multi-fidelity modeling, where data from different sources are known to be of different accuracies (i.e., fidelity). Many of the existing methods for generating multi-fidelity surrogate models are based on the idea that the high-fidelity experiments can be approximated as a tuned or corrected functions of low-fidelity models. This approach was generalized by Toropov with three types of tuning: linear and multiplicative functions, correction factors, and the use of low-fidelity model inputs as tuning parameters. For the first two types, the analyst must specify a functional relationship between the low- and high-fidelity functions. The third type requires that the low-fidelity code(s) possess inputs that can serve as tuning parameters. Kriging and Gaussian process regression have also been proposed for the multi-fidelity analysis problem. These methods use an auto-regressive model to correct low-fidelity predictions, and the response covariance matrix is modified to account for the multiple data sources. In some multi-fidelity modeling scenarios, it is assumed that sources of data are available from different fidelities. However, data sources coming from different legacy systems might have the same fidelity. Additionally, most of the typical multi-fidelity methods become computationally expensive when more using two or more sources.

An alternate approach to multi-fidelity modeling is to use ensemble learning. In ensemble learning, two or more related but different analytical models are combined together to improve the accuracy of predictive analytics. One of the commonly used ensemble learning approaches is Bayesian Model Averaging (BMA). One of the main advantages of BMA is that it accounts for model uncertainty that may arise due to the modeling method, as well sparsity of the data used. However, the main issue of BMA is that all the models are built using same data set. That means, for the current problem addressed in the present disclosure, all of the legacy data would have to be combined together to form a single database. Different models would need to be built using the single database, which is then combined to form an ensemble model. However, marginalizing all the legacy data together can lead to a number of issues. For example, if discrepancies exist in the data between each legacy system, large data noises will be introduced during the modeling process. Also, models built on each legacy system data can have more information than the models build on combined dataset.

In the present disclosure, a Bayesian multi-source modeling approach is developed for legacy data that addresses the aforementioned challenges. Some embodiments may be, in some respects, similar to Bayesian Model Averaging where different models are built and combined together to build a better predictive model. However, unlike BMA, the models herein are built for each legacy data set separately and independently of each other. In some embodiments, the model validity is evaluated for each model as a function of input space, which is then used to combine the models. The details of the methodology and a demonstration of the method on three different numerical experiments are disclosed below.

In some embodiments, a goal is to build a model for a new design with sparse data, wherein the sparse dataset alone is not sufficient to build an accurate model. However, while there is sparse data for the new system, there is a relatively large number of data available from multiple legacy designs that are not exactly same as the new design but belong to a similar design family. In some aspects, it is assumed that the performance of the new design will not be exactly same as any individual legacy design, but there will generally be some similarity in the performance trends.

As an example, let's say n* number of data are available for the new design with $y^*=[y_1^*, \ldots, y_{n^*}^*]^T$ as outputs and $x^*=[x_1^*, \ldots, x_{n^*}^*]^T$ as inputs. Consider that legacy data are available from p number of legacy systems from a similar family. The input for $k^{th}$ data source is given by $x_k=[x_{1k}, \ldots, x_{nk}k]^T$, where $n_k$ is the number of data points available in the $k^{th}$ data source. The corresponding output for each data point is given as $y_k=[y_{1k}, \ldots, y_{nk}k]^T$. It is assumed that the input variables (design, operational, etc.) and the output variables (performance, cost, etc.) are the same for the new system and all the legacy systems. However, it is not required that a subset of $x_k$ be collocated with x*, i.e. it is not required to have $x_j^*=x_{jk}$ for any j and k.

Figure 1B:
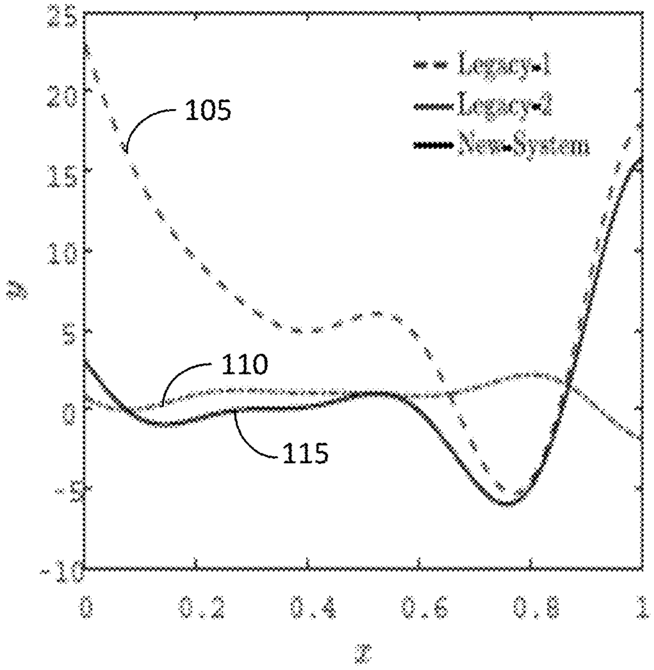

Let's define $\mathbb{M}_k=\hat{\eta}_k^{legacy}(x)$ as a meta-model built on the $k^{th}$ legacy dataset. In a typical Bayesian Model Averaging approach, a model for the new data source is given as $$f*(x)=\sum_{k=1}^{p} w_k\hat{\eta}_k^{legacy}(x) \tag{1}$$

where $w_i$ is the model validity associated with each legacy data model and can be estimated by various techniques [14]. However, there are two main issues in directly using this approach. First, there can be large discrepancies between one or more of the legacy systems and the new system, while having a similar trend. This can lead to an inappropriate allocation of model validity. For example, in FIG. 1A legacy-1 dataset 105 has a similar trend to the new system 115, however due to a large discrepancy it's validity can be low. Secondly, the model validity may also vary in input space. For example, in FIG. 1B the validity of legacy-1 dataset 105 is higher for higher values of x while the validity of legacy-2 dataset 110 is higher for lower values of x.

To overcome these challenges, the discrepancy of the legacy data is also included in the legacy model as $\mathbb{M}_k=\hat{\eta}_k^{legacy}(x)+\hat{\delta}_k^{legacy}(x)$. Also, it is assumed that the model validity may vary in the design space. The new formulation used in the present disclosure is given as $$\hat{f}*(x)=\sum_{k=1}^{p} \hat{w}_k(x)\left(\hat{\eta}_k^{legacy}(x)+\hat{\delta}_k^{legacy}(x)\right) \tag{2}$$

where $\hat{\delta}_k^{legacy}$ is the discrepancy model of the $k^{th}$ legacy model with data from new design, and $\hat{w}_k$ is the model validity which is a function of the input variables such that $\hat{\Sigma}_{k=1}^{P}\hat{w}_k(x)$ for any value of x. In some embodiments herein, both $\hat{\eta}_k^{legacy}$ and $\hat{\delta}_k^{legacy}$ are built using a Bayesian Hybrid Modeling (BHM) approach. In some embodiments, the model validity $\hat{w}_k$ or weight attributed to the model is estimated by calculating, for example, the legacy model likelihood and predictive uncertainty. In some embodiments, other metrics may be used to represent a validity or weight to assign to each model associated with the multiple different legacy datasets. It is noted that the weights associated with the individual legacy BHM models may be normalized such that the summation thereof equals 100% (i.e., $\Sigma_{k=1}^{P}\hat{w}_k(x)=1$).

Figure 2:
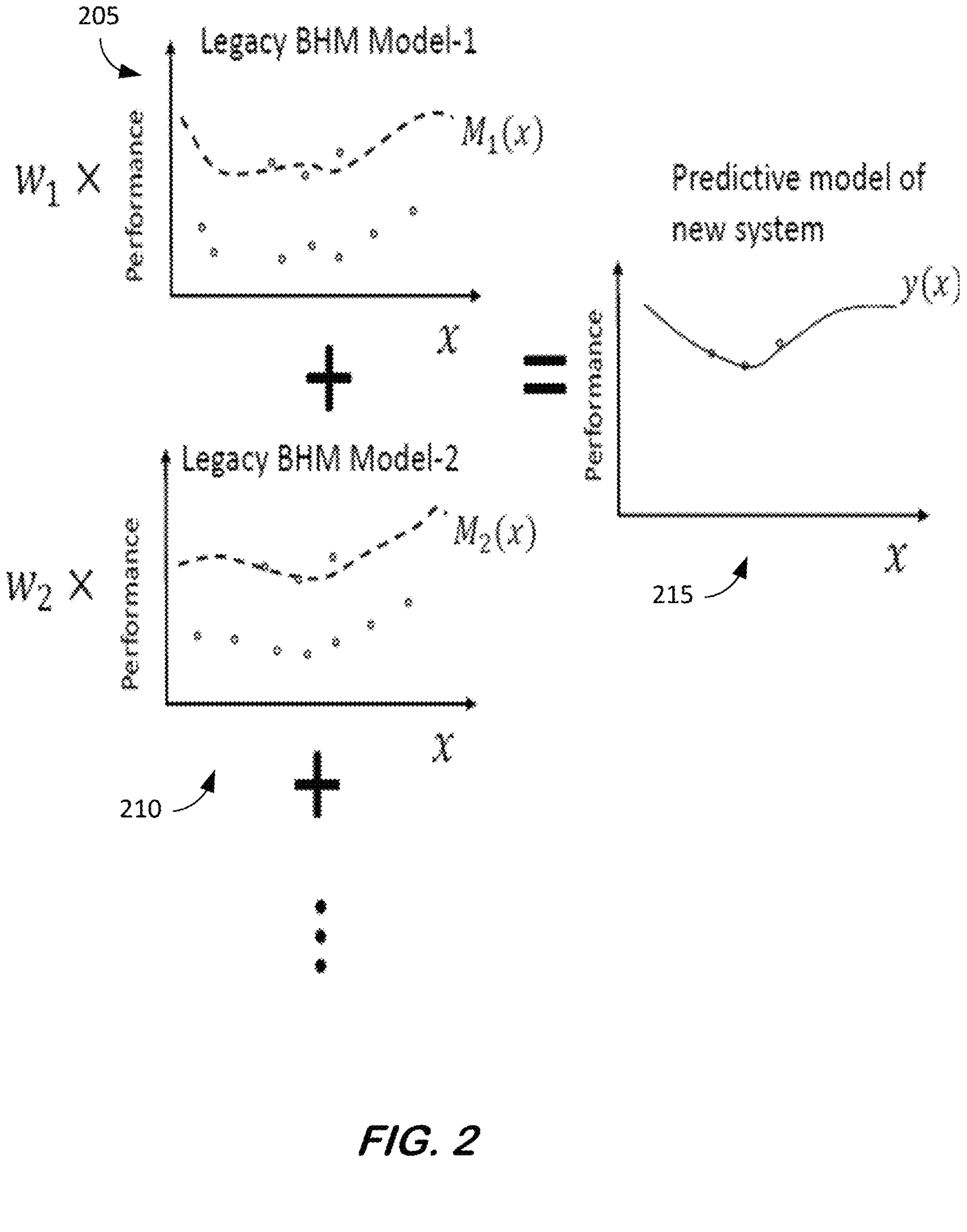
FIG. 2 is an illustrative depiction of some aspects of multi-source modeling, in accordance with some embodiments.

In general, some embodiments of the present disclosure's multi-source modeling may be represented by a model for new system (e.g., a derivative turbine system, etc.) data given as:

$$y_{new}(x)=\Sigma w_i M_i(x)$$

where $M_i$ is the individual legacy BHM model for each legacy data $(\eta(x)+\delta(x))$ and $w_i$ are the weights associated with the individual BHM, such that, $\Sigma w_i=1$. FIG. 2 is an illustrative depiction of multi-source modeling wherein multiple legacy data and a BHM model for each legacy dataset are used to determine a predictive model for new data. Referring to FIG. 2, a legacy BHM Model-1 graph, $M_1(x)$, 205 associated with a first legacy dataset and a legacy BHM Model-2 graph, $M_2(x)$, 210 associated with a second legacy dataset are each multiplied by their associated weight $w_1$ and $w_2$, respectively, and summed to obtain the predictive model of the new system shown at 215. In this example, if the weight of model $M_1$ is (0.02) twice that of model $M_2$ (0.01), then $w_1$=66% and $w_2$=33% such that the total sum of the weights of all models=100%. While the example of FIG. 2 includes two legacy datasets, the multiple sources of legacy data may include more than two (2) datasets.

To model the legacy data and the discrepancy, a Bayesian framework, such as proposed by Kennedy and O'Hangan, is used in some embodiments herein and is referred to as a Bayesian Hybrid Model (BHM). BHM is used to combine test/experimental (i.e., legacy) data and simulation (i.e., new system) data to perform a calibration of a computer model and to quantify the discrepancy of a simulation model. Let y(x) represent the outputs of the experimental process and $\eta(x, \theta)$ represent the outputs of computer simulation where x are the input variables and $\theta$ are unobservable model parameters or calibration parameters of the simulation model. According to the framework, the experimental observation of outputs y is expressed as:

$$y(x_z)=\eta(x_i,\theta^*)+\delta(x_i)+\epsilon(x_i),\text{ for } i=1,\ldots,n \tag{3}$$

where $\eta$ is the number of experimental observations, $\theta^*$ are the true values of the calibration parameters, $\delta$ is the discrepancy between the calibrated simulator $\eta$ and the experimental observation, and E are well characterized observation errors.

In some embodiments of the present disclosure, the models of the legacy data are built using the same Bayesian philosophy:

$$y^*(x_i)=\eta_k^{legacy}(x_i)+\delta_k^{legacy}(x_i)\pm\epsilon_k(x_i),\text{ for } i=1,\ldots,n^* \tag{4}$$

where y* is the output of new data source, $\eta_k^{legacy}(x)$ is the output of the $k^{th}$ legacy system, $\delta_k(x)$ is the discrepancy between the $k^{th}$ legacy system and the new system, and $\epsilon_k$ are well-characterized observation errors. It should be noted that the calibration parameters are not used in Equation 4 because the legacy data may not contain these parameters. However, if calibration parameters $\theta_k$ are available, it can be included in Equation 4.

The output of a legacy system $\eta(x)$ and it's discrepancy $\delta(x)$ are modeled as Gaussian Processes (GP) as described by, for example, Kennedy and O'Hagan and Higdon et al. The model for a given legacy system $\eta(x)$ is approximated as a GP model with a zero mean and covariance matrix given by, $$\sum_{ij}^{\eta} = \frac{1}{\lambda_{\eta_z}}\exp(\beta_\eta|X_i - X_j|^2) + I\frac{1}{\lambda_{\eta_s}}, \text{ for } i, j = 1, \ldots n_k \quad (5)$$

where X is the vector of design variables, the parameters $\lambda_{\eta_z}$ and $\lambda_{\eta_s}$ characterize the marginal data variance captured by the model and by the residuals, respectively, $\beta$ characterizes the strength of dependence of the outputs on the design variables. The outputs of new system $y(x)$ is modeled as a GP model:

$$\sum_{ij}^{y} = \frac{1}{\lambda_{y_z}}\exp(\beta_y|X_i - X_j|^2) + I\frac{1}{\lambda_{y_s}}, \text{ for } i, j = 1, \ldots n^* \quad (6)$$

The cross covariance matrix to represent correlation between the legacy system outputs and the new system observations is given as $$\sum_{ij}^{\eta y} = \frac{1}{\lambda_{y_z}}\exp(\beta_y|X_i - X_j|^2) + I\frac{1}{\lambda_{y_s}}, \text{ for } i = 1, \ldots n^*, \quad (7)$$
$$j = 1, \ldots, n_k$$

The discrepancy parameter $\delta$ is modeled as $$\sum_{i,j}^{\delta} = \frac{1}{\lambda_{\delta_z}}\exp(\beta_\delta|X_i - X_j|^2), \text{ for } i, j = 1, \ldots n^* \quad (8)$$

The likelihood of combined data $z=(y^T, \eta^T)$ is then given as $$\mathbb{L}(D \mid \lambda_{\eta_z}, \beta_\eta, \lambda_{\eta_s}, \lambda_{\delta_z}, \beta_\delta) = \frac{1}{|\Sigma|^{1/2}}\exp\left(-\frac{1}{2}D^T\Sigma^{-1}D\right) \quad (9)$$

where $D = (y^T, \eta^T, \delta^T)$ and $$\Sigma = \begin{pmatrix} \Sigma_\delta & 0 & 0 \\ 0 & \Sigma_y & \Sigma_{y\eta} \\ 0 & \Sigma_{\eta y} & \Sigma_\eta \end{pmatrix} + \begin{pmatrix} \Sigma_{new} & 0 \\ 0 & \Sigma_{legacy} \end{pmatrix}$$

The posterior distribution of all the hyper-parameters is given by $$\pi(\lambda_{\eta_z}, \beta_\eta, \lambda_{\eta_s}, \lambda_{\delta_z}, \beta_\delta | D) = \mathbb{L}(D | \lambda_{\eta_z}, \beta_\eta, \lambda_{\eta_s}, \lambda_{\delta_z}, \beta_\delta)\pi(\beta_\eta)\pi(\lambda_{\eta_s})\pi(\lambda_{\delta_z})\pi(\beta_\delta) \quad (10)$$

where $\pi(\cdot)$ on the right-hand side of the equation is the prior distribution of the parameters. The target posterior distribution is evaluated using a Markov Chain Monte Carlo (MCMC) approach.

In some embodiments, once the $\hat{\eta}_k^{legacy}$ and $\hat{\delta}_k^{legacy}$ models are built for each legacy dataset, the next step is to estimate the model validity. In the present disclosure, different metrics may be used to estimate model validity. Herein, two specific metrics are discussed that may be used to estimate model validity. The first metric is a likelihood-based model validity or weight, while the second metric is an uncertainty-based model validity or weight. In some embodiments, other metrics may be used.

Figure 3:
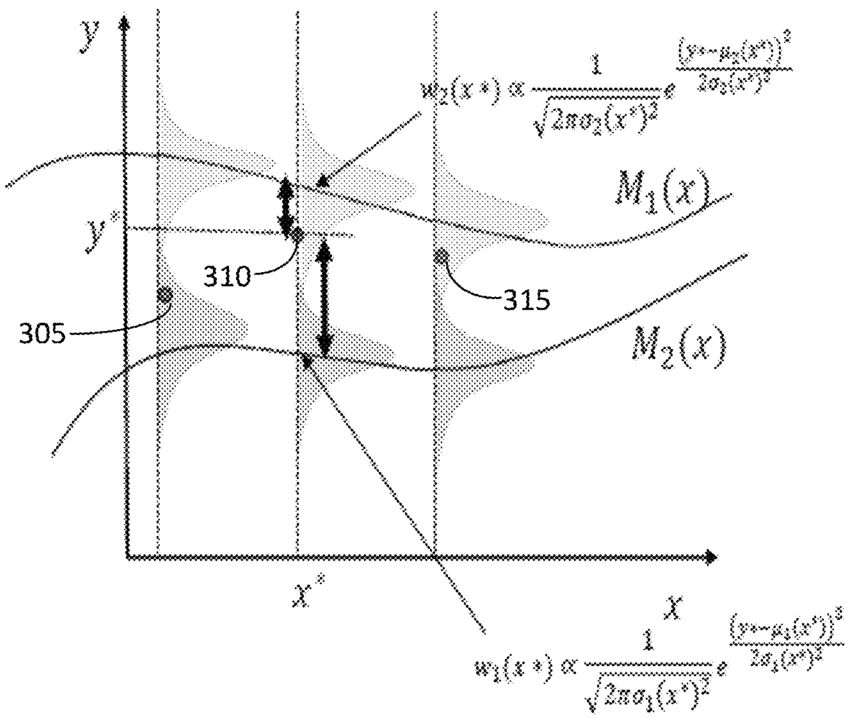
FIG. 3 is am illustrative depiction of likelihood-based model validity, in accordance with some aspects of an example process herein.

In the likelihood-based model validity, the validity of a legacy model at an available input setting x* of the new design is proportional to the probability of the legacy model to predict the output or performance of the new design, as shown in FIG. 2. For example, the likelihood of the $k^{th}$ legacy model, $\mathbb{M}_k$ at a location x*, for which output of new design is known to be y* is given as $\mathbb{M}$ $$w_k^{likelihood}(x^*) \propto \mathbb{P}(y^* \mid \mathbb{M}_k) = \frac{1}{\sqrt{2\pi\sigma_k(x^*)^2}}\exp\left(\frac{(y^* - \mu_k(x^*)^2)}{2\sigma_k(x^*)^2}\right) \quad (11)$$

where $\mu_k(x^*)$ and $\sigma_k(x^*)$ are the predictive mean and standard deviation of the $k^{th}$ legacy model $\mathbb{M}_k = \eta_n^{legacy}(x) + \hat{\delta}_k^{legacy}(x)$ at design input variable specified by x*. FIG. 3 is an illustrative depiction of two legacy models $M_1(x)$ and $M_2(x)$, where the weight of each model is proportional to how likely it predicts new data (i.e., likelihood-based weights). For each model, the mean value and a probabilistic distribution (i.e., shaded curves) is determined for each new data point, 305, 310, and 315. As shown, at data point 305 $M_2$ has a higher probability of predicting the new data, whereas $M_1$ has a higher probability of predicting the new data point 310.

In the uncertainty-based model validity, the model validity is inversely proportional to the predictive uncertainty of legacy only model $\hat{\eta}_k^{legacy}$. In other words, the validity of a legacy model $\mathbb{M}_k$ reduces as it goes farther from the available legacy data which is indicated by the predictive standard deviation $\hat{\eta}_n^{legacy}(x)$, as shown in FIG. 4 and given as $$w_k^{uncertainty}(x) \propto \frac{1}{\sigma_{\eta_k}^{legacy}(x)} \quad (12)$$

Figure 4:
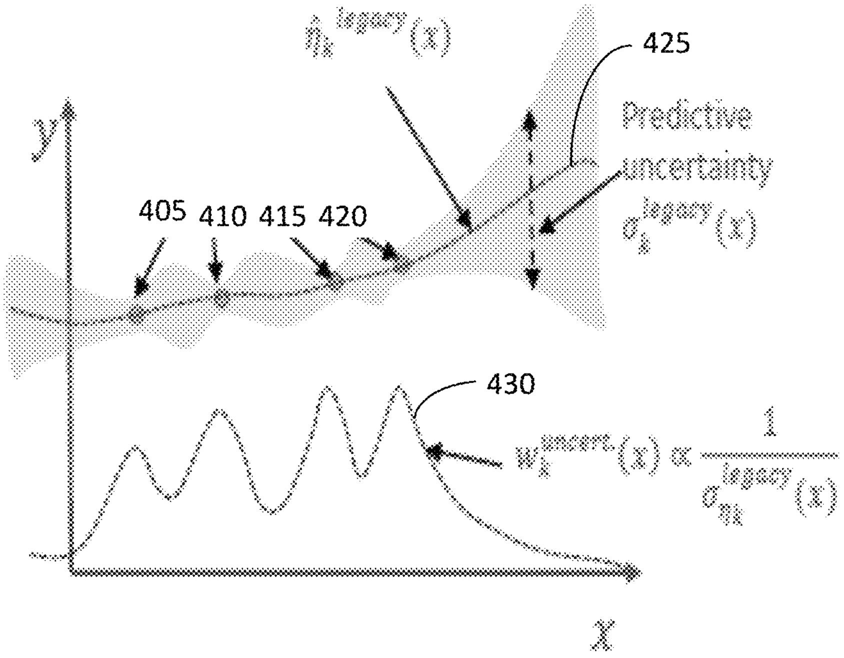
FIG. 4 is am illustrative depiction of uncertainty-based model validity, in accordance with some aspects of an example process herein.

As shown in FIG. 4, legacy data 405, 410, 415, and 420 is represented by legacy model 425, wherein the associated uncertainty based weighs represented at graph 430 are lower farther away from the available legacy data and higher at instances of the available data.

In some embodiments, an overall model validity of the $k^{th}$ legacy model at a given design point x is then given as $$w_k(x) = w_k^{likelihood}(x)w_k^{uncertainty}(x) = \kappa(x)\frac{\mathbb{P}(y^{new} \mid \mathbb{M}_k)}{\sigma_{\eta_k}^{legacy}(x)} \quad (13)$$

where κ(x) is proportionality factors given as $$\kappa(x) = 1 \Big/ \sum_{k=1}^{p} \frac{\mathbb{P}(y^{new} \mid \mathbb{M}_k)}{\sigma_{\eta_k}^{legacy}(x)}.$$

In some embodiments where the weights for the individual models are based on other, additional, or fewer metrics than likelihood and uncertainty, these other weight determinations (e.g., user-specified weights for a legacy model, where the user assigned weight can be based on, for example, a user's knowledge of the performance of the legacy system) will be used in a similar manner as the likelihood and uncertainty weight determinations illustrated above to determine the overall weight. In some embodiments, one or more weight determinations may be calculated for each legacy model. In some instances, one or more of the weight determinations may be combined to calculate an overall weight in the multi-source modeling in some embodiments. That is, not all of the weights may be combined in some applications and use-cases.

In some embodiments, it is noted that $\hat{\delta}_n^{legacy}(x)$ is the byproduct of each legacy BHM modeling and can be estimated directly using the legacy Gaussian Process model $\hat{\eta}_k^{legacy}$ during the prediction. However, the model likelihood $\mathbb{P}(y^{new} \mid \mathbb{M}_k)$ is only known at design points x* where data for new designs are available and need to be interpolated or extrapolate for other design points. In the current work, a Gaussian Process model of $\mathbb{P}(y \mid \mathbb{M}_k)$ is built for each legacy model to estimate a likelihood-based model validity at any location in the design space.

In some aspects, in general, multi-source modeling herein may be represented by a continuous weight model as follows $$y_{new}(x)=\Sigma w_i(x)M_i(x)$$

where the individual corrected legacy models and their associated weights are combined to build the continuous weight model. That is, although the individual corrected legacy models estimate a weight at certain data points (x), the continuous weight model built based on those estimates are valid for predictions at all points in a range of data points.

Figure 5:
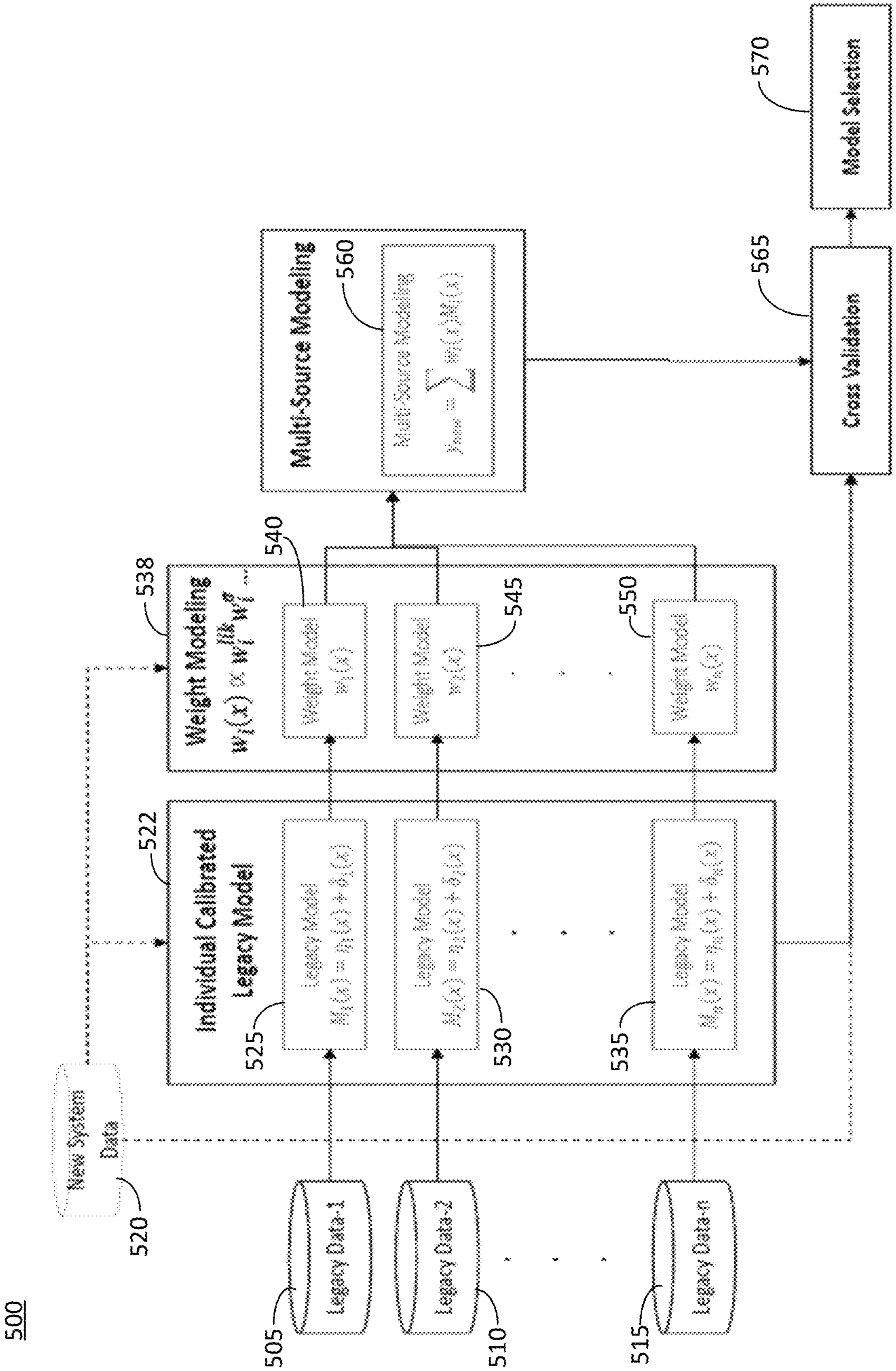
FIG. 5 is an illustrative system, in accordance with some embodiments herein.

FIG. 5 is an illustrative system 500 that demonstrates a processing flow, in accordance with some embodiments of the present disclosure of a multi-source modeling solution or framework. System 500 receives legacy data 505, 510, and 515 related to multiple different legacy systems. The data may be received from one or more data sources, including, for example, a server, a database, a data store, a third-party data servicer or service, a data stream, etc. In some instances, the data may be of a known fidelity or accuracy and in some instances the fidelity might not be known. New system data 520 (e.g., limited or sparse data) is also received by system 500. The multiple different legacy datasets and the new system data are used to calculate individual calibrated (or corrected) legacy models (e.g., 525, 530, and 535) by calibrated legacy model calculation module 522 and to calculate weighted calibrated legacy models (e.g., 540, 545, and 550) by weighted calibrated legacy model calculation module 538. In some embodiments, the individual calibrated legacy models and the weighted calibrated legacy models may be calculated in accordance with some of the equations disclosed herein. A multi-source model is generated by multi-source modeling module 560 based on the determined individual calibrated legacy models and the determined weighted calibrated legacy models.

In some embodiments, the multi-source model may be validated by cross-validation module 565 using, for example, a cross-validation process wherein different data is used to train the model and validate the model. In some aspects, the cross-validation (or other type of validation process) may be used by model selection module 570 to determine or recommend which model(s) to use or select to best predict the performance of the new system, where the different models may be associated with different legacy datasets, different model weighting schemes or processes, etc.

Following are three different, illustrative examples carried out by Applicant(s) hereof to demonstrate the benefit of Bayesian multisource modeling, in accordance with the present disclosure. It is noted that the following examples are illustrative of various aspects of the present disclosure and the specific values used in the examples are not meant to be limitations on the scope of the present disclosure.

The first test case is a mathematical problem, the second test case is an analytical problem for borehole design, and the third is an experimental problem to estimate the crack propagation rate of a new aluminum alloy.

The first test case is a two dimensional exponential function reported by Currin et al., which is treated as a true function and is given by Equation 14. The design space of the input variables is defined by $x_i \in [0, 1]$, for all i=1, 2.

$$f_{exp}(x) = \left[1 - \exp\left(-\frac{1}{2x_2}\right)\right]\frac{2300x_1^3 + 1900x_2^2 + 2092x_1 + 60}{100x_1^3 + 500x_1^2 + 4x_1 + 20} \tag{14}$$

Two legacy data sources are used to demonstrate the benefit of multi-source modeling in this example. They are generated using two different lower fidelity functions and are labeled as legacy-1 and legacy-2 in FIGS. 6A and 6B. The first legacy source is a lower fidelity model used by Xiong et al. and is given by Equation 15. The second legacy data source is built from a low fidelity function generated using a quadratic equation given by Equation 16.

$$f_{L1}(x)=\tfrac{1}{4}[f_{exp}(x_1+0.05, x_2+0.05)+f_{exp}(x_1+0.05, \max(0, x_2-0.05))]+\tfrac{1}{4}[f_{exp}(x_1-0.05, x_2+0.05)+f_{exp}(x_1-0.05, \max(0, x_2-0.05))] \tag{15}$$

$$f_{L2}(x)=16.55-10.15x_1-13.24r_2+2.6x_1x_2i+4.56x_1^2+3.77x_2^2 \tag{16}$$

Figure 6B:
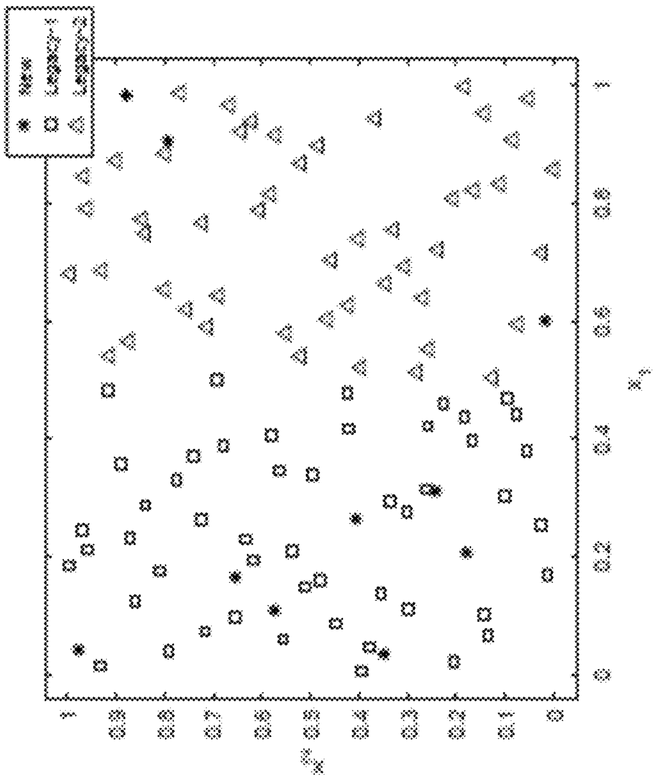
FIGS. 6A and 6B are illustrative depictions of true and legacy functions and a data distribution for an exponential function, in accordance with some embodiments.
Figure 6A:
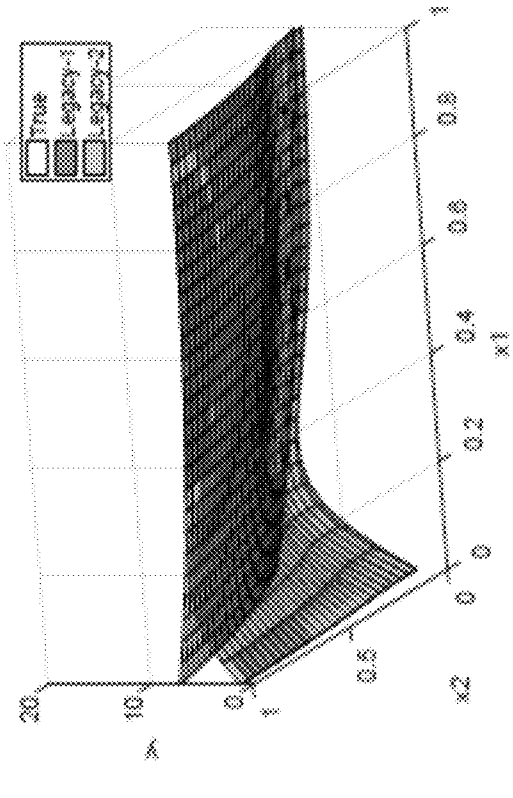

The behavior of the true and the legacy functions are shown in FIG. 6A. As seen, the legacy-1 function is very similar to the true function in entire design space. The legacy-2 function however is only accurate for higher values of $x_1$ and does not capture the non-linear behavior for lower values of $x_1$.

To train the BHM and multi-source models, 10 randomly selected new designs are generated using the true function within the original design space in the present examples. Also, 100 additional are generated using the true function and are used for validation. For the legacy-1 data source, 50 designs are generated using Equation 15 within the design space of $x_1 \in [0, 0.5]$ and $x_2 \in [0, 1]$, while for the legacy-2 data source, 50 designs are generated using Equation 16 within the design space of $x_1 \in [0.5, 1]$ and $x_2 \in [0, 1]$. The selected data points in input space are shown in FIG. 6B.

Figure 7A:
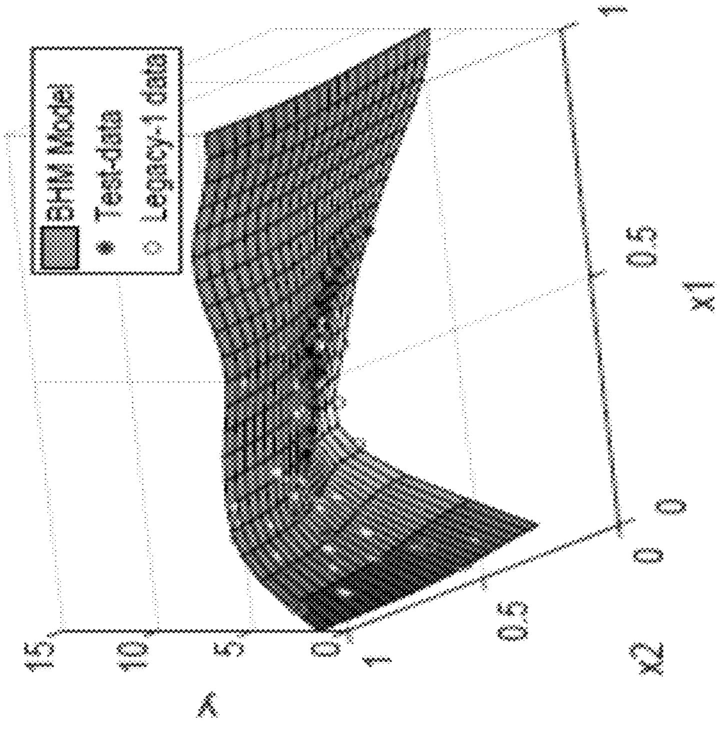
FIGS. 7A and 7B are illustrative depictions of a Bayesian hybrid model (BHM) for legacy sources for an exponential function, in accordance with some embodiments.
Figure 7B:
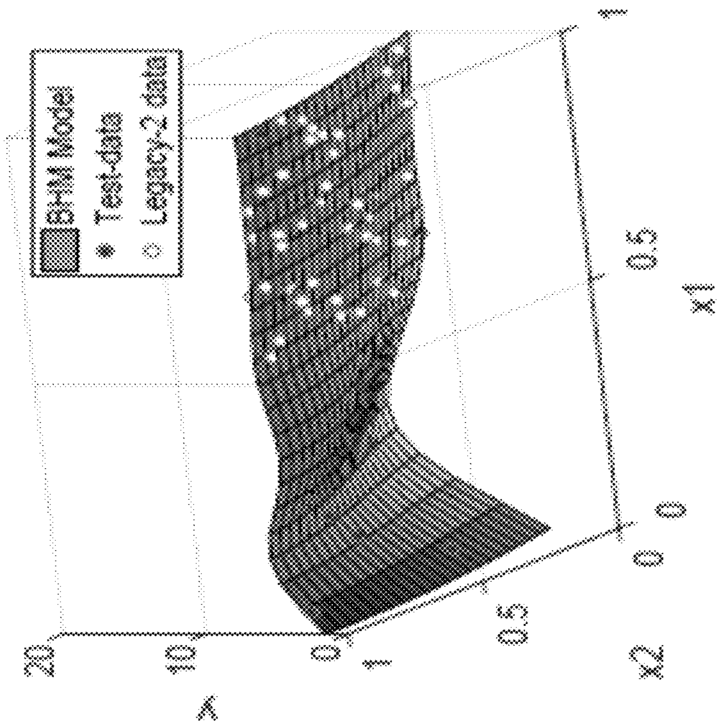

In accordance with a first step of multi-source modeling herein, BHM models of individual legacy source and discrepancy are built using the respective data sources. The surface plot for each legacy BHM model, $\mathbb{M}_k = \hat{\eta}_k^{legacy}(x) + \hat{\delta}_k^{legacy}(x)$, is shown in FIGS. 7A and 7B. FIG. 7A includes a depiction of legacy BHM model for the Legacy-1 data and FIG. 7B includes a depiction of the legacy BHM model for the legacy-2 data of the present example.

Figure 8B:
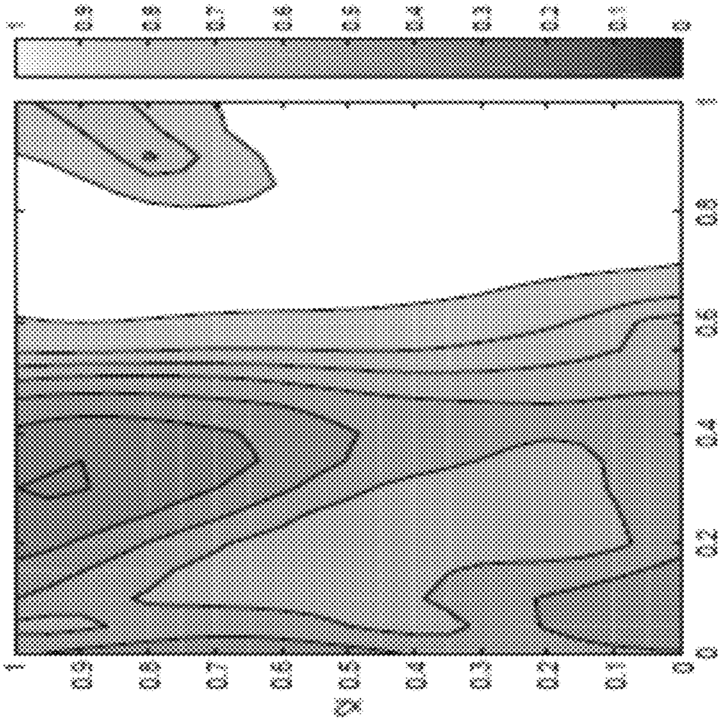
FIGS. 8A and 8B are illustrative depictions of model validity for legacy functions for an exponential function, in accordance with some embodiments.
Figure 8A:
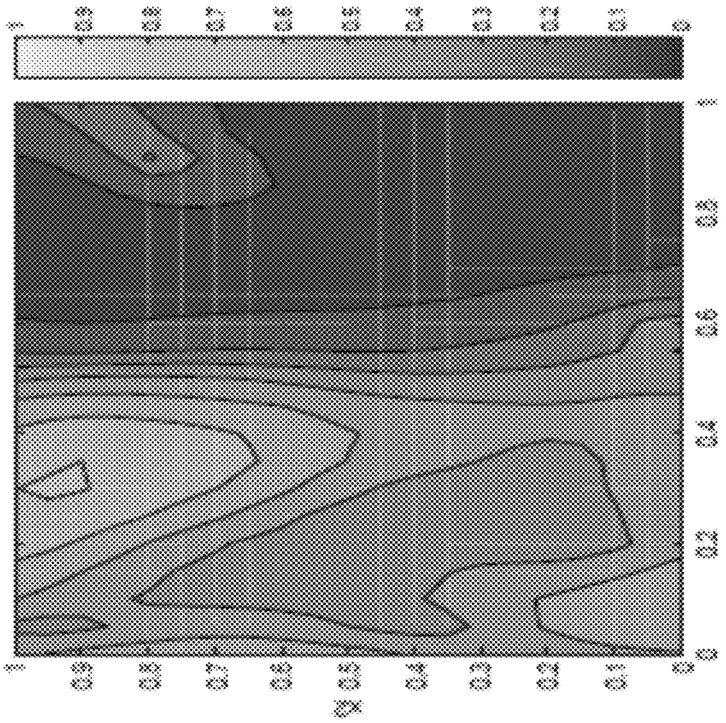

Next, the model validity of each legacy model is calculated for each data point generated from the true function and the BHM models. The contour plot of normalized model validity for both the legacy models is shown in FIGS. 8A and 8B. It can be seen that the model validity of the legacy-1 BHM model shown in FIG. 8A is relatively low for higher values of $x_1$, while the validity of the legacy-2 BHM model is relatively low for lower values of $x_1$. This is mainly due to the predictive uncertainty of each legacy model. For example, the data for the legacy-2 model are only available in the region of $x_1 \in [0.5, 1]$, which causes a higher predictive uncertainty in the model in the region of $x_1 \in [0, 0.5]$. However, there are regions around lower values of $x_1$ where the validity of legacy-2 model is still better than the legacy-1 model. This is due to the contribution of likelihood term in model validity, i.e. in this region the likelihood of the legacy-2 model to predict the true function overpowers the predictive uncertainty when compared to the legacy-1 model.

Figure 9B:
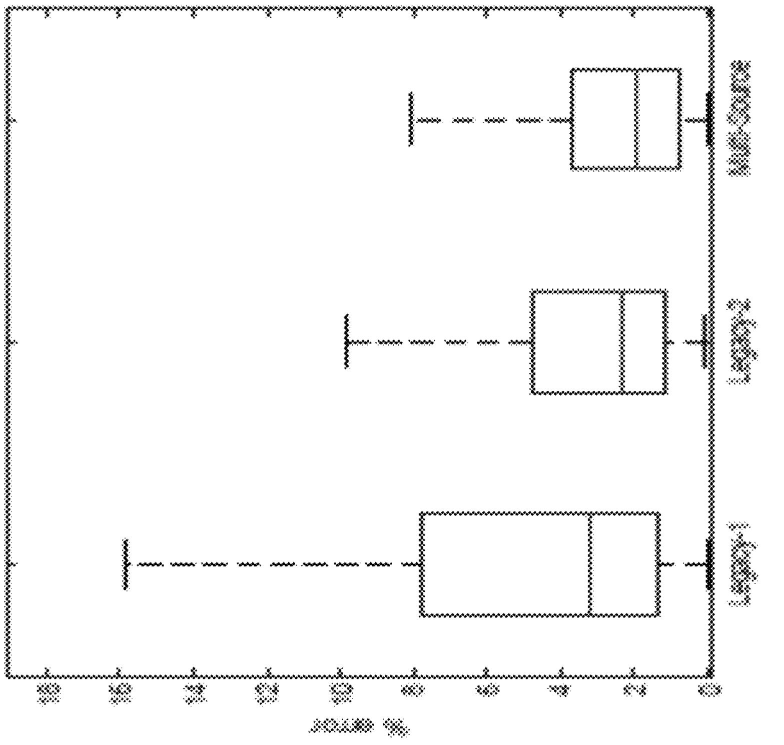
FIGS. 9A and 9B are illustrative depictions of prediction and error on validation data for an exponential function, in accordance with some embodiments.
Figure 9A:
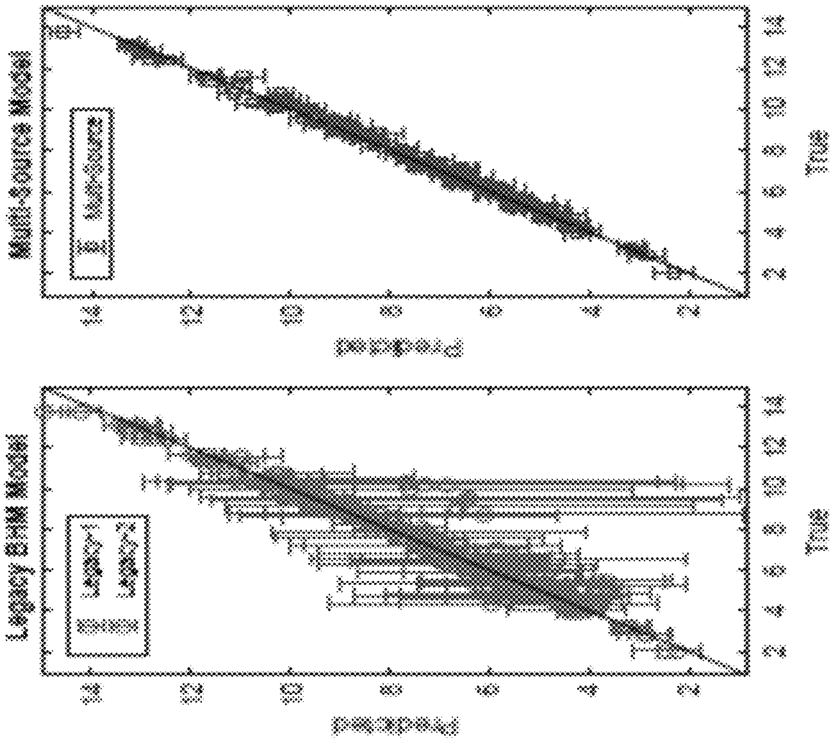

Once the multi-source model is built, it may be validated with the validation data set for the new design. In FIG. 9A, the left plot shows the predicted versus actual plot of each legacy BHM model. As seen in FIG. 9A, the legacy-1 model has a higher error and higher predictive uncertainty when compared to the legacy-2 model. The right plot of FIG. 9A shows the predictions of the multi-source model that combines both of the legacy models. The multi-source model has better predictive accuracy than the legacy BHM models. The improvement in prediction by multi-source modeling is also shown by the percentage error box plot shown in FIG. 9B. In this example, the median, third quartile and the maximum percentage error was found to be better for the multi-source model.

A second test problem used to demonstrate multi-source modeling is the Borehole problem where an analytical function is used to calculate the water flow rate through a borehole. The analytical function is given in Equation 17. For the true function, parameter $\alpha$ is given as $\alpha=[2\pi, 1.0, 2.0]$ and is used to generate data for the new design. Additionally, two legacy data sources are generated using the same function but with different parameter values. For the legacy-1 data source, $\alpha=[5, 1.5, 2.0]$ is used while for the legacy-2 data source, $\alpha=[6, 0, 1.8]$ is used.

$$f(x) = \frac{\alpha_1 T_u (H_u - H_l)}{\ln(r/r_w)\left(\alpha_2 + \frac{\alpha_3 L T_u}{\ln(r/r_w) r_w^2 K_w} + \frac{T_u}{T_l}\right)} \qquad (17)$$

The definition and ranges of all the variables are given in Table 1 below.

TABLE 1

| Variable | Definition | Range |
|---|---|---|
| $r_w$ | Radius of borehole (m) | [0.05, 0.15] |
| r | Radius of influence (m) | [100, 50000] |
| $T_u$ | Transmissivity of upper aquifer ($m^2$/yr) | [63070, 115600] |
| $H_u$ | Potentiometric head of upper aquifer (m) | [990, 1110] |
| $T_l$ | Transmissivity of lower aquifer ($m^2$/yr) | [63.1, 116] |
| $H_l$ | Potentiometric head of lower aquifer (m) | [700, 820] |

TABLE 1-continued

| Variable | Definition | Range |
|---|---|---|
| L | Length of borehole (m) | [1120, 1680] |
| $K_w$ | Hydraulic conductivity of borehole (m/yr) | [9855, 12045] |

Figure 10:
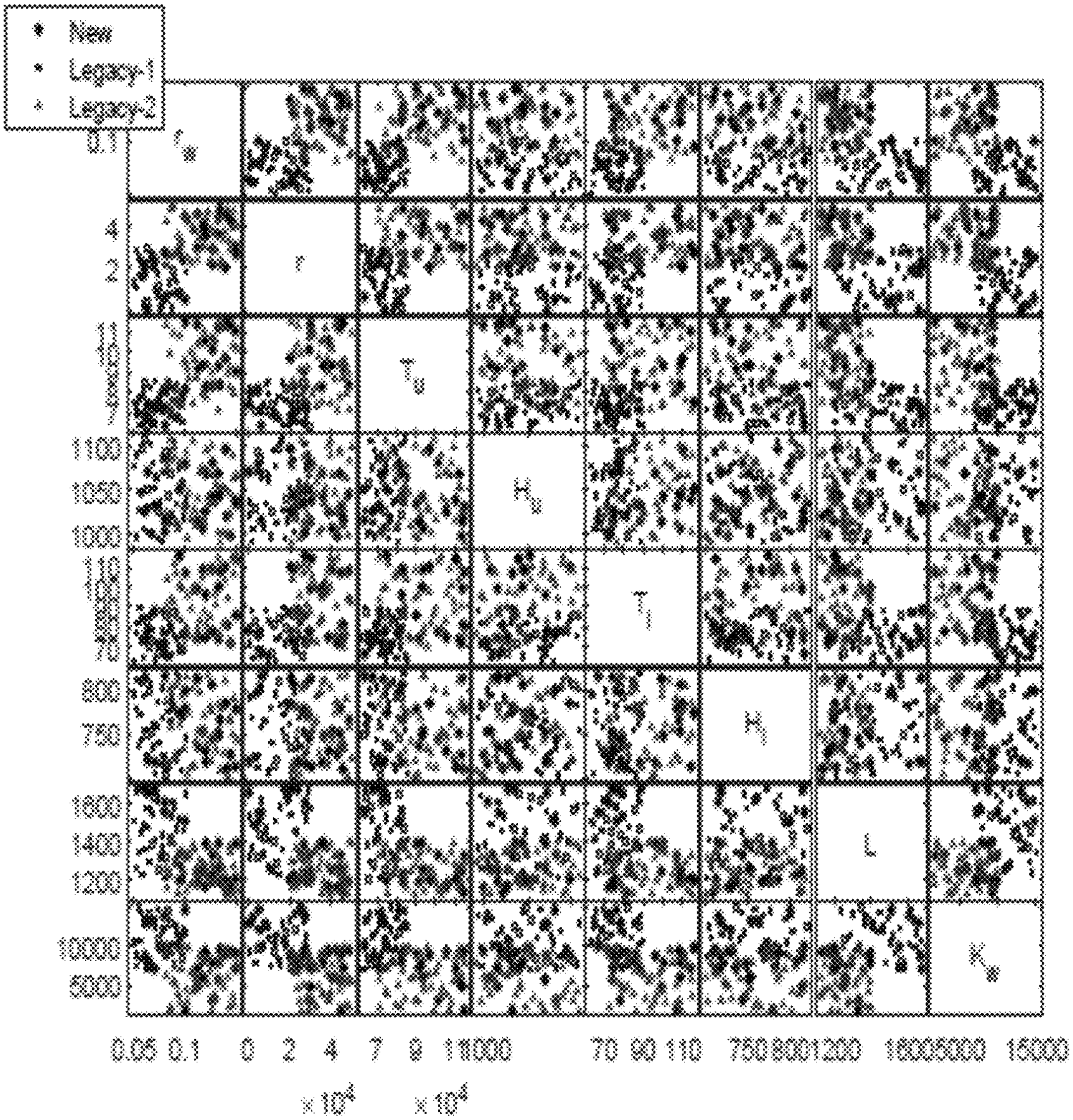
FIG. 10 is an illustrative depiction of a data distribution of a new design and legacy designs for a borehole problem, in accordance with some embodiments.

To carry out the multi-source modeling in this example, 23 data points are generated for the new design, 50 data points are generated for the legacy-1 source, and 40 data points are generated for the legacy-2 data source. The distribution of data points in the input design space is shown in FIG. 10. Note that data is missing in some parts of the design space for each legacy data. This is deliberately done to simulate a scenario typical in real engineering problems where legacy designs are built for different requirements.

Figure 11B:
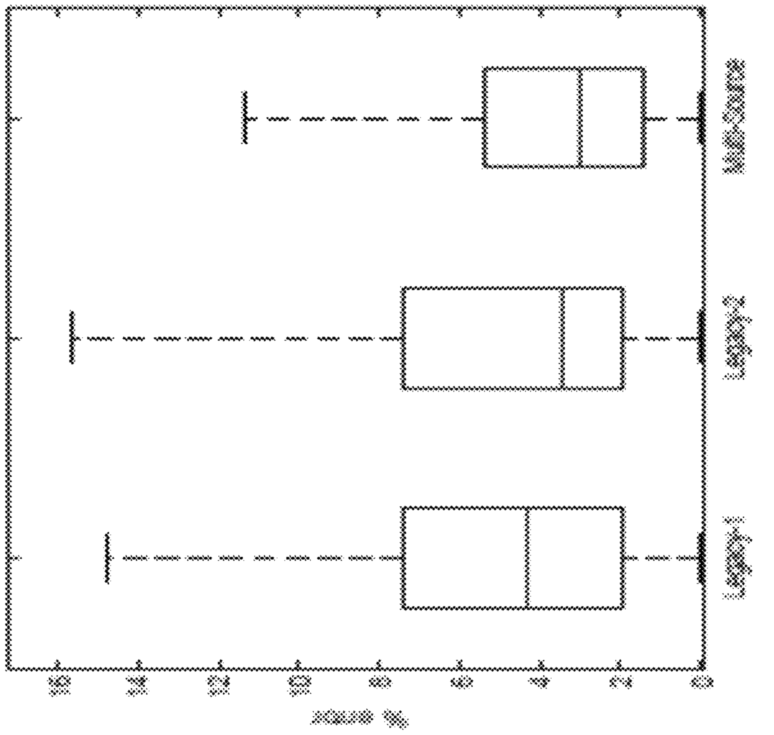
FIGS. 11A and 11B are illustrative depictions of a prediction and error on validation data of a borehole problem, in accordance with some embodiments.
Figure 11A:
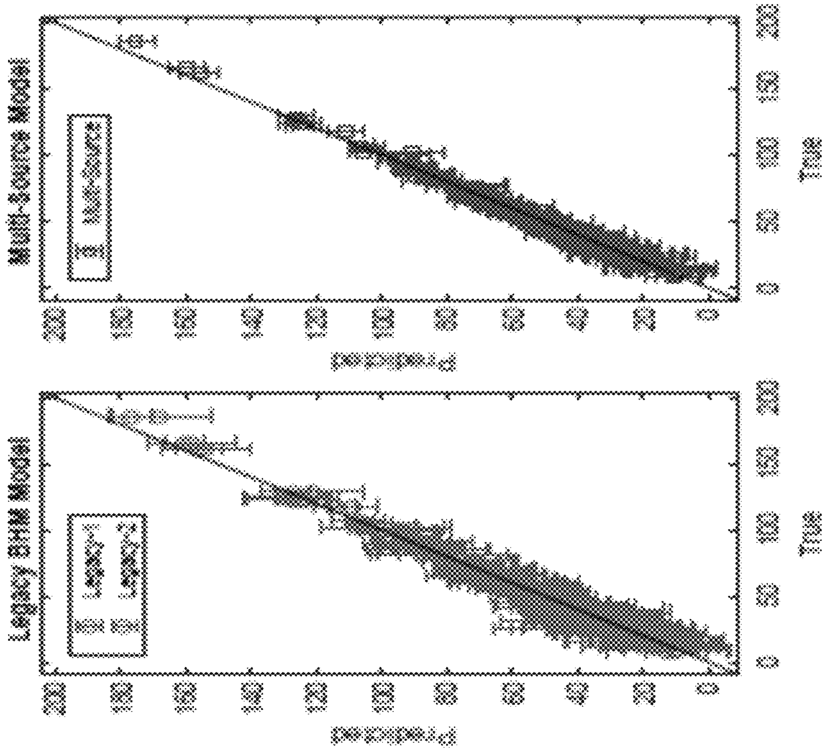

For validation, 200 additional data points were generated using the true function and are predicted using the multi-source model. The left plot of FIG. 11A shows the predicted versus actual plot for each legacy BHM model, while the right plot shows the same for the multi-source model. It can be observed that the prediction of the multi-source model is relatively tighter to the 45° line than each legacy model. FIG. 11B shows the box plot of percentage error of legacy models and multi-source model for all the validation data. Similar to the previous example, the multi-source model had better predictive capability than each legacy model.

Figure 12B:
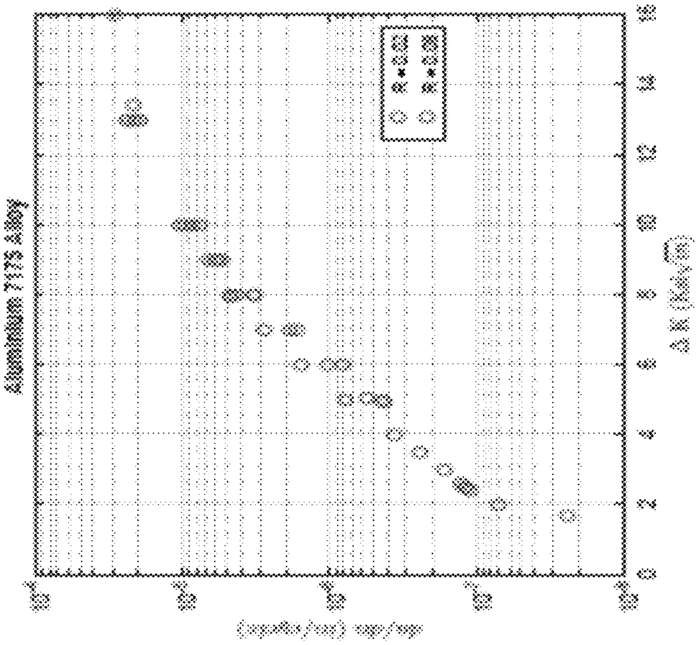
FIGS. 12A, 12B, and 12C are illustrative depictions of material crack growth rate data for legacy and new aluminum alloys for an example problem, in accordance with some embodiments.
Figure 12A:
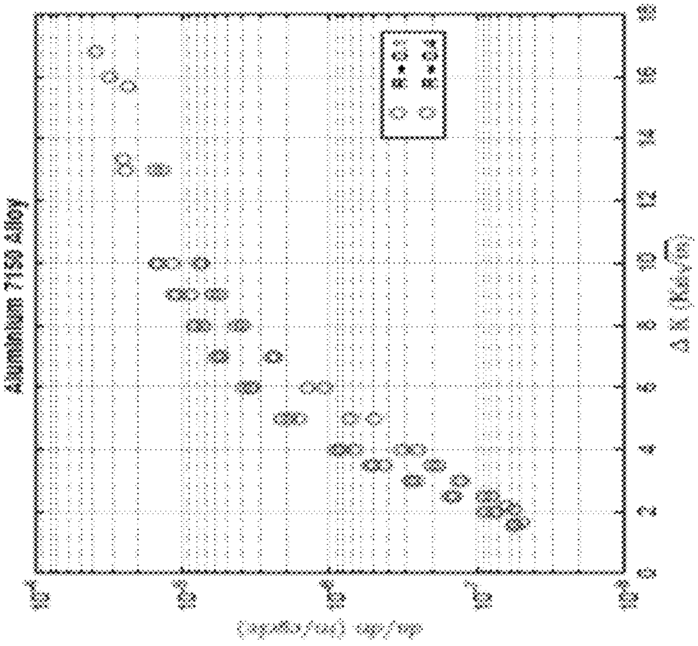
Figure 12C:
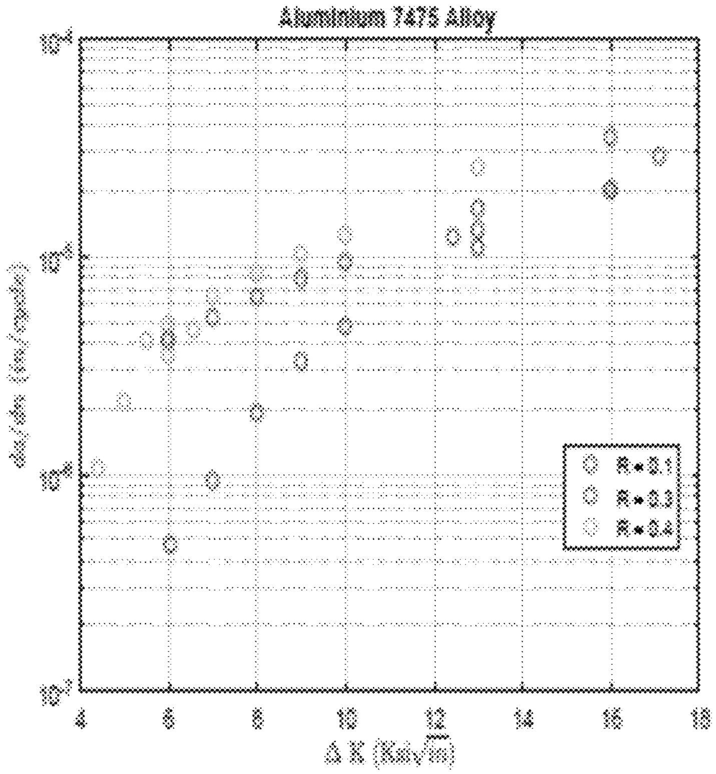
Figure 13:
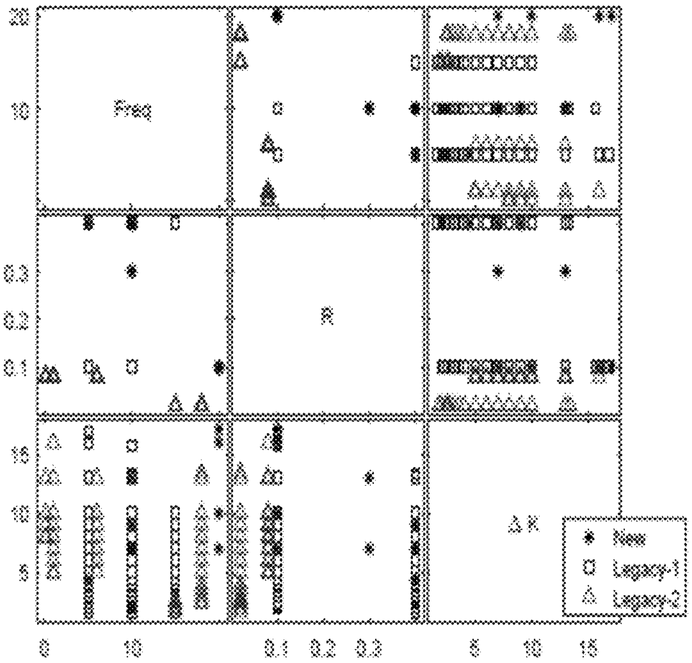
FIG. 13 is an illustrative depiction of a data distribution of new design and legacy designs of a material crack growth rate example problem, in accordance with some embodiments.

A third example is disclosed to demonstrate the multi-source modeling method herein on an engineering problem, material crack growth rate data of three different aluminum alloys are used from a Damage Tolerant Design Handbook. The Al7475 alloy is assumed to be a new design, while Al-7150 and Al-7175 alloys are assumed to be legacy designs. For each of these alloys, crack growth rate (da/dn) data is extracted for various loading frequencies (Freq), stress ratios (R), amplitude stress intensity factors ($\Delta K$). The data were only extracted for test environment of LAB AIR (Laboratory Air) and L.H.A (Low Humidity Air, <10% RH) and a material orientation of L-T. For legacy material Al-7150 and Al-7175, 40 and 38 data points are extracted, respectively. For the new design, Al-7475, 24 data points are extracted out of which 10 data points are used for training and 14 data points are used for validation. The extracted data are shown in FIGS. 12A, 12B, and 12C and the scatter plot of input variables are shown in FIG. 13.

Figure 14B:
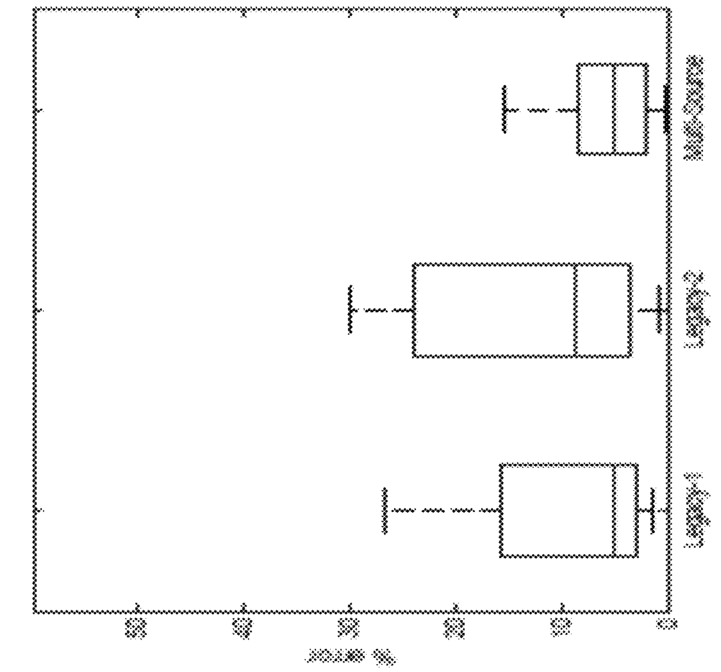
FIGS. 14A and 14B are illustrative depictions of a prediction and error on validation data of a material crack growth rate example problem, in accordance with some embodiments.
Figure 14A:
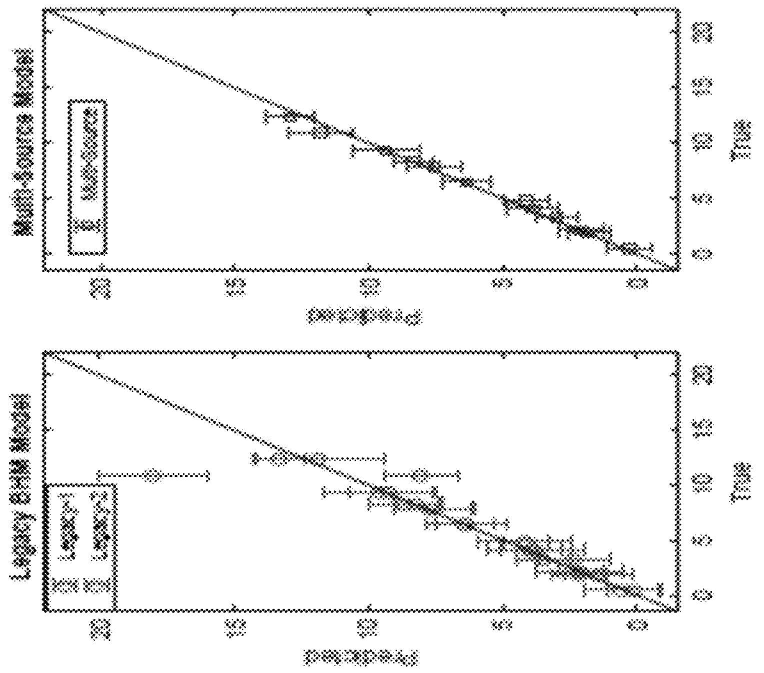

To carry out the multi-source modeling in this example, legacy BHM models of crack growth rate and models of model validity are built as a function of frequency, stress ratio, and amplitude stress intensity factor. The multi-source model is validated with 14 data points from the Al-7475 alloy and were not used for training. The predicted versus actual plot is shown in FIG. 14A and the box plot of percentage error is shown in 14B. It is observed in FIG. 14B that the multi-source modeling method is able to significantly improve the predictive accuracy in this case, as compared to either of the legacy BHM models alone.

In some embodiments, the Bayesian multi-source modeling approach for legacy data disclosed herein is developed to overcome some of the issues of prior multi-fidelity and ensemble modeling techniques. In the disclosed approach, models of each legacy system and the corresponding discrepancy with the new design is built using a Bayesian Hybrid Model (BHM) framework. Models were, in some embodiments, built for the validity of each legacy system as a function of input space. Then, the ensemble model is used to carry out the predictive analysis for a new design. The method(s) herein have been demonstrated with two analytical problems and engineering problem and have been found to improve the accuracy of prediction for all three examples.

Figure 15:
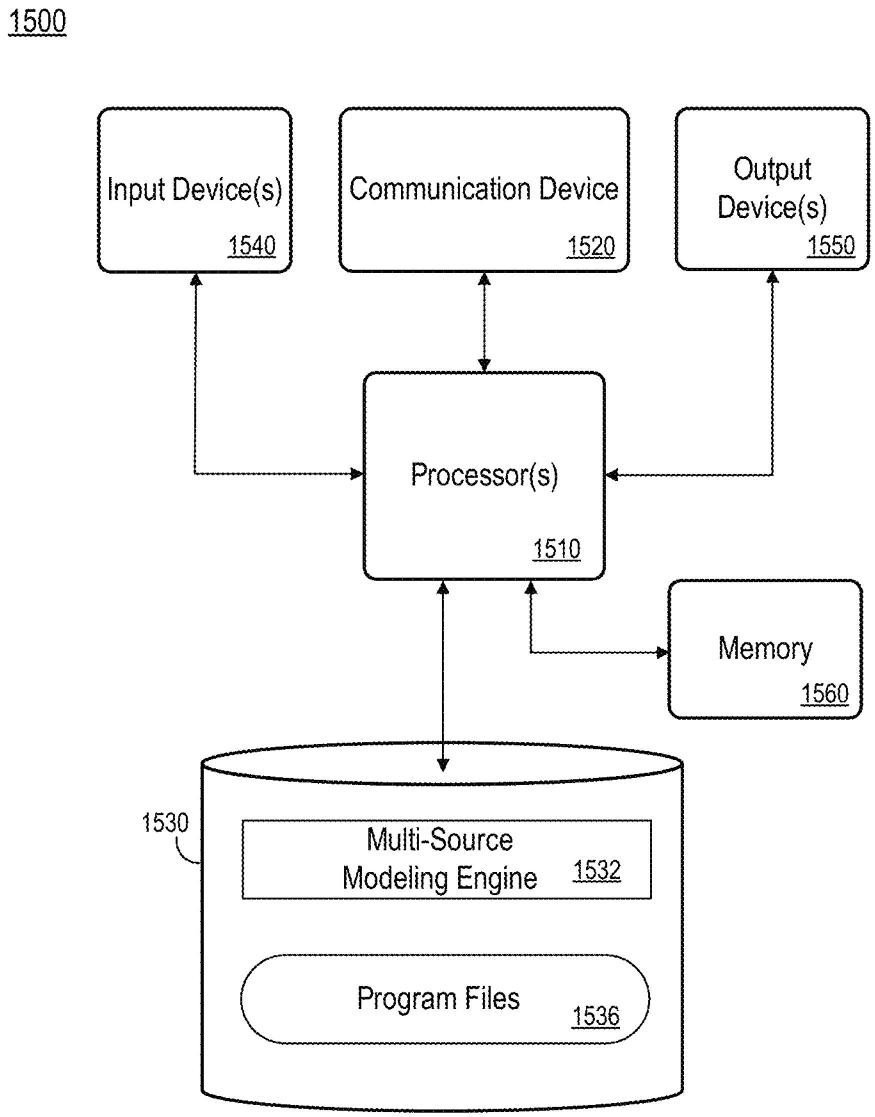
FIG. 15 illustrates a schematic diagram of a system, in accordance with some embodiments.

FIG. 15 is a block diagram of computing system 1500 according to some embodiments. System 1500 may comprise a general-purpose or special-purpose computing apparatus and may execute program code to perform any of the methods, operations, and functions described herein. System 1500 may comprise an implementation of one or more systems (e.g., system 500 or parts thereof, etc.) and processes (and/or portions thereof) disclosed herein and executed by, for example, system 500. System 1500 may include other elements that are not shown, according to some embodiments.

System 1500 includes processor(s) 1510 operatively coupled to communication device 1520, data storage device 1530, one or more input devices 1540, one or more output devices 1550, and memory 1560. Communication device 1520 may facilitate communication with external devices, such as a data server and other data sources. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into system 1500 via a user interface. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM), Storage Class Memory (SCM) or any other fast-access memory. Files including, for example, model representations of a part, output records of processes herein, and other data structures may be stored in data storage device 1530.

Multi-Source Modeling Engine 1532 may comprise program code executed by processor(s) 1510 (and within the execution engine) to cause system 1500 to perform any one or more of the processes described herein. Embodiments are not limited to execution by a single apparatus. Data storage device 1530 may also store data and other program code 1536 for providing additional functionality and/or which are necessary for operation of system 1500, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining multi-source modeling for a (new) system based on a limited dataset for the new system and multiple different legacy datasets.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method for estimating a crack propagation rate, comprising:

receiving, by a processor, a first dataset for a new material design;

receiving, by the processor, second and third datasets for a plurality of different legacy systems associated with at least one of an existing material design, the first, second, or third dataset including crack growth rate data for at least one of a loading frequency, a stress ratio, or an amplitude stress intensity factor;

determining, by the processor, a legacy model for each of the plurality of different legacy systems based on the respective second and third dataset for each of the plurality of different legacy systems and the first dataset for the new material design, the legacy model based on a validity of each legacy system, the validity determined using a legacy model likelihood validity and a predictive uncertainty model validity, the legacy model built as a function of at least one of the loading frequency, the stress ratio, or the amplitude stress intensity factor;

calculating, by the processor, a model weight to associate with each of the determined legacy models;

determining, by the processor and based on a combination of the determined legacy models for the plurality of different legacy systems and the weight associated therewith, a first multi-source model for new data for the new material design;

saving, by the processor, a record of the determined first multi-source model;

determining, by the processor, a predictive analysis for a new dataset for the new material design based on the first multi-source model, the predictive analysis including an estimated crack propagation rate for the new material design;

generating, by the processor, a second multi-source model based on the predictive analysis, a model prediction accuracy of the second multi-source model higher than the model prediction accuracy of the first multi-source model; and estimating, by the processor, the crack propagation rate based on the second multi-source model.

2. The method of claim 1, wherein each legacy model is determined based on a model for legacy data for each respective legacy model and a discrepancy model indicative of a discrepancy from the legacy system to the new design.

3. The method of claim 1, further comprising associating the calculated model weight with each of the determined legacy.

4. The method of claim 1, wherein the model weight to associate with each of the determined legacy model is at least one of a likelihood-based weight, an uncertainty-based weight, and a user-specified weight.

5. The method of claim 1, wherein the model weight is calculated as a fixed value for a legacy model.

6. The method of claim 1, wherein the model weight is calculated as a variable value for a legacy model, wherein the weight can vary for each data point in a legacy model dataset.

7. The method of claim 1, wherein more than one type of model weight to associate with each of the determined legacy models is calculated for at least some of the plurality of legacy models, wherein cross-validation is used to determine which of the at least one type of model weight to actually associate with each of the determined legacy models.

8. The method of claim 1, wherein multiple different types of model weight to associate with each of the determined legacy model is calculated for at least some of the plurality of legacy models and an overall weight is determined for the at least some of the plurality of legacy models based on a combination of the multiple different types of model weight.

9. The method of claim 1, wherein the legacy model is determined using Bayesian Hybrid Modeling.

10. A system for estimating a crack propagation rate, comprising:

a memory storing processor-executable instructions; and one or more processors to execute the processor-executable instructions to:

receive a first dataset for a new material design;

receive second and third datasets for a plurality of different legacy systems associated with at least one of an existing material design, the first, second, or third dataset including crack growth rate data for at least one of a loading frequency, a stress ratio, or an amplitude stress intensity factor;

determine a legacy model for each of the plurality of different legacy systems based on the respective second and third dataset for each of the plurality of different legacy systems and the first dataset for the new material design, the legacy model based on a validity of each legacy system, the validity determined using a legacy model likelihood validity and a predictive uncertainty model validity, the legacy model built as a function of at least one of the loading frequency, the stress ratio, or the amplitude stress intensity factor;

calculate a model weight to associate with each of the determined legacy models;

determine, based on a combination of the determined legacy models for the plurality of different legacy systems and the weight associated therewith, a first multi-source model for new data for the new material design;

save a record of the determined first multi-source model;

determine a predictive analysis for a new dataset for the new material design based on the first multi-source model, the predictive analysis including an estimated crack propagation rate for the new material design;

generate a second multi-source model based on the predictive analysis, a model prediction accuracy of the second multi-source model higher than the model prediction accuracy of the first multi-source model; and estimate the crack propagation rate based on the second multi-source model.

11. The system of claim 10, wherein each legacy model is determined based on a model for legacy data for each respective legacy model and a discrepancy model indicative of a discrepancy from the legacy system to the new design.

12. The system of claim 10, further comprising the one or more processors to execute the processor-executable instructions to associate the model weight with each of the determined legacy.

13. The system of claim 10, wherein the model weight to associate with each of the determined legacy model is at least one of a likelihood-based weight, an uncertainty-based weight, and a user-specified weight.

14. The system of claim 10, wherein the model weight is calculated as a fixed value for a legacy model.

15. The system of claim 10, wherein the model weight is calculated as a variable value for a legacy model, wherein the weight can vary for each data point in a legacy model dataset.

16. The system of claim 10, wherein more than one type of model weight to associate with each of the determined legacy model is calculated for at least some of the plurality of legacy models, wherein cross-validation is used to determine which of the at least one type of model weight to actually associate with each of the determined legacy models.

17. The system of claim 10, wherein multiple different types of model weight to associate with each of the determined legacy model is calculated for at least some of the plurality of legacy models and an overall weight is determined for the at least some of the plurality of legacy models based on a combination of the multiple different types of model weight.

18. The system of claim 10, wherein the legacy model determined using Bayesian Hybrid Modeling.

19. The method of claim 1, wherein the validity of the legacy model at an input setting is proportional to a probability of the legacy model to predict an output or performance of the new design.

20. The method of claim 1, wherein the validity of the uncertainty model is inversely proportional to the predictive uncertainty of the legacy model.

* * * * *